United States Patent
Sundaram et al.

(10) Patent No.: US 11,854,157 B2
(45) Date of Patent: Dec. 26, 2023

(54) EDGE-AWARE UPSCALING FOR IMPROVED SCREEN CONTENT QUALITY

(71) Applicant: INTEL CORPORATION, Santa Clara, CA (US)

(72) Inventors: Vijay Sundaram, San Jose, CA (US); Yi-Jen Chiu, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 757 days.

(21) Appl. No.: 16/822,686

(22) Filed: Mar. 18, 2020

(65) Prior Publication Data

US 2020/0219229 A1 Jul. 9, 2020

(51) Int. Cl.
*G06T 3/40* (2006.01)
*G06T 7/00* (2017.01)
*G06T 7/13* (2017.01)
*G06F 18/241* (2023.01)
*G06V 10/44* (2022.01)
*G06V 20/62* (2022.01)

(52) U.S. Cl.
CPC ............ *G06T 3/403* (2013.01); *G06F 18/241* (2023.01); *G06T 3/4007* (2013.01); *G06T 7/0002* (2013.01); *G06T 7/13* (2017.01); *G06V 10/44* (2022.01); *G06V 20/635* (2022.01)

(58) Field of Classification Search
CPC ..... G06T 3/403; G06T 3/4007; G06T 7/0002; G06T 7/13
USPC .......................................... 382/254
See application file for complete search history.

(56) References Cited

U.S. PATENT DOCUMENTS

2009/0087120 A1\* 4/2009 Wei .................. G06T 3/403
382/254

FOREIGN PATENT DOCUMENTS

WO WO-2014127665 A1 \* 8/2014 ........... G06T 3/4007

\* cited by examiner

*Primary Examiner* — Ayodeji O Ayotunde
(74) *Attorney, Agent, or Firm* — HANLEY, FLIGHT AND ZIMMERMAN, LLC

(57) ABSTRACT

An apparatus for edge aware upscaling is described herein. The apparatus comprises a potential edge detector, a thin-edge detector, a one-directional edge detector, a correlation detector, and a corrector. The potential edge detector identifies potential edge pixels in an input image, and the thin-edge detector detects thin edges in the potential edge pixels of the input image. The one-directional edge detector detects one-directional edges in the potential edge pixels of the input image, and the correlation detector detects strongly correlated edges in the potential edge pixels of the input image. The corrector derives a target output value based on an edge type and classification of a corresponding input pixel as identified by a source map point.

25 Claims, 12 Drawing Sheets

| -1 | 0 | 1 |
|---|---|---|
| -2 | 0 | 2 |
| -1 | 0 | 1 |

Horizontal
204

| 1 | 2 | 1 |
|---|---|---|
| 0 | 0 | 0 |
| -1 | -2 | -1 |

Vertical
202

| 0 | 1 | 2 |
|---|---|---|
| -1 | 0 | 1 |
| -2 | -1 | 0 |

45 Degrees
206

| 2 | 1 | 0 |
|---|---|---|
| 1 | 0 | -1 |
| 0 | -1 | -2 |

135 Degrees
208

200
FIG. 2

| P0 | P1 | P2 | P3 | P4 | P5 | P6 | P7 | P8 |

| P00 | P01 | P02 | P03 | P04 |
|-----|-----|-----|-----|-----|
| P10 | P11 | P12 | P13 | P14 |
| P20 | P21 | P22 | P23 | P24 |
| P30 | P31 | P32 | P33 | P34 |
| P40 | P41 | P42 | P43 | P44 |

EDGE-AWARE UPSCALING FOR IMPROVED SCREEN CONTENT QUALITY

BACKGROUND

Image content is rendered using pixels, which represent the smallest renderable unit of the image. In various applications, an input image may be scaled by sampling the content of the input image at various pixels and processing the samples to obtain an output image of a different size when compared to the input image.

BRIEF DESCRIPTION OF THE DRAWINGS

FIG. 2 is an illustration of 3×3 Sobel matrices;

FIG. 4 is an illustration of a linear array of pixels;

FIG. 6 is an illustration of a 5×5 neighborhood of pixels;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
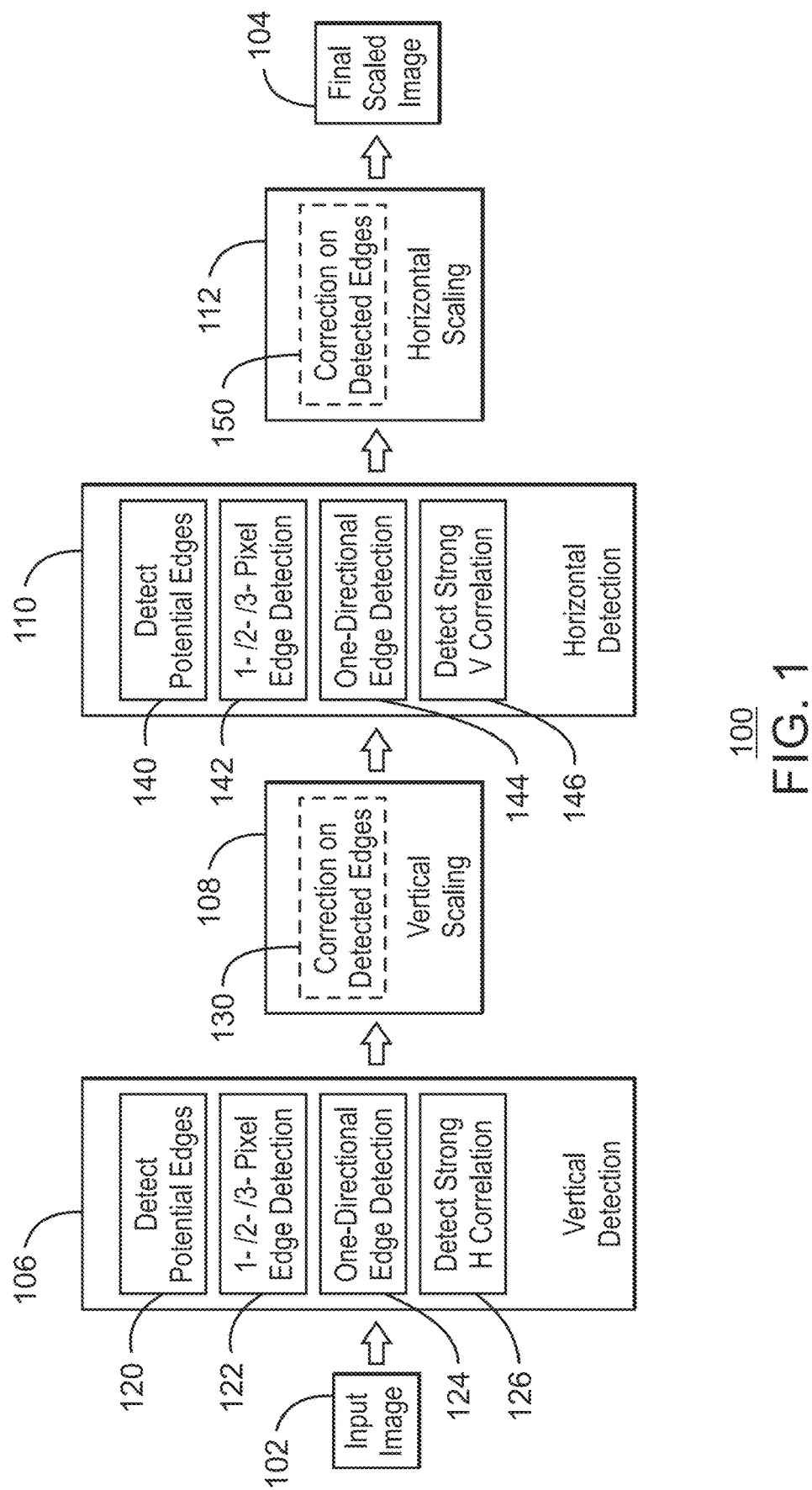
FIG. 1 is a block diagram of a system for edge-aware upscaling for improved screen content quality according to the present techniques.

A variety of applications may require image scaling, which can include image upscaling and image downscaling. Image scaling is the process of resizing the image (upscaling or downscaling) with usages requiring the image or video to fit to display resolution. Image upscaling may increase a size of the original image, while image downscaling may decrease the size of the original image. Generally, image upscaling is accomplished by resampling the input image via a reconstruction filter. Image downscaling is accomplished by down sampling a smaller image from a higher-resolution original input image.

The images to be scaled may include screen content. As used herein, screen content generally refers to digitally generated pixels present in images or video. Pixels generated digitally, in contrast with pixels captured by an imager or camera, may have different properties. In examples, screen content includes video containing a significant portion of rendered graphics, text, or animation rather than camera-captured video scenes. Pixels captured by an imager or camera contain content captured from the real-world, while pixels of screen content are generated electronically. Put another way, the original source of screen content is electronic.

Screen content or computer generated/rendered content images are typically composed of fewer colors, simpler shapes, a larger frequency of thin lines, and sharper color transitions when compared to other content, such as natural content. While upscaling screen content, traditional large-tap filter scaling solutions create artifacts while scaling thin-edge areas in the screen content. The artifacts manifest as color artifacts and intensity bleeding, leading to blurred scaled images. As used herein, a large-tap filter may be a filter that is used during traditional image upscaling. For example, a generic, large-tap filter may be used in reconstruction techniques such as nearest neighbor interpolation, bilinear interpolation, bicubic interpolations, Sinc resampling, Lanczos resampling, Fourier based interpolations, and the like.

These general reconstruction techniques are often targeted for use cases where the output quality is not of utmost concern, such as the nearest-neighbor and bilinear interpolations. Traditional edge-directed interpolation, such as Lanczos resampling, performs poorly in areas with thin-edges. Moreover, when filtering with only Lanczos kernels that include a large-tap filter, scaling across thin-edges results in unpredictable behavior, including artifacts in-between the edges and intensity bleeding across the edges, causing a blurred output. Thin edges are typically seen in screen content, especially with text overlaid on a plain background or in gaming content with rendered scenes. Often, areas of an image with thin-edges are critical parts of the image, such as interactive text or the score board of a game. Critical parts of the image are those portions of the image that convey an integral concept or information from the image.

The present techniques enable edge-aware upscaling for improved screen content quality. In embodiments, image upscaling is visually improved by eliminating artifacts that occur as a result of processing thin-edge areas in screen content. The visual quality improvements directly translate to a better overall user experience. The present techniques enhance image upscaling quality by characterizing content of the input image and applying different processing to areas of interest in the input image. Areas of interest may refer to the features in the input image likely to create artifacts during upscaling. The areas of interest may refer to regions in the input image that create artifacts during upscaling via Lanczos resampling. Finally, in embodiments the areas of interest may also refer to regions in the input image along the periphery of a thin-edge as detected in the input image.

The areas of interest may be identified by pixels detected via content analysis. Appropriate scaling methods are then applied to in the detected pixels of interest based on the scaling factor (map-back location to the input image). Also, the detection/correction is applied only to the luma component of the image. Luminance (luma), as used herein, refers to a brightness representation associated with various color spaces. For example, the YUV color space is defined by one luma component (Y) and two chrominance components, referred to as a blue projection (U) and a red projection (V). As described below, the present techniques correct the luma components of an input image, while the chroma components are unchanged.

The areas of interest may be features, such as edges. Generally, an edge is a collection of pixels in a digital image where some pixel value changes abruptly. For example, the pixels in a digital image where the luma value changes quickly can be organized into a set of curved line segments referred to as an edge. Each pixel represents a discrete point within the image. There is an assumption of an underlying continuous pixel value function, from which the pixels have been sampled. Accordingly, at an edge, the abrupt change in pixel values may occur gradually, with a portion of the pixel change occurring across a series of pixels. An edge may have a direction, where the direction of the edge is horizontal or vertical. An edge may be referred to as "thin" if the number of pixels along the width of the edge is below a threshold. As described herein, a thin edge is a one-pixel, two-pixel or three-pixel edge as described below. The one-pixel, two-pixel and three-pixel edges are typically found in text/screen and gaming content.

FIG. 1 is a block diagram of a system 100 for edge-aware upscaling for improved screen content quality according to the present techniques. The input image 102 may be input to the system 100 to obtain a final scaled output image 104. The system 100 includes vertical edge detection 106, vertical scaling 108, horizontal edge detection 110, and horizontal scaling 112. The block diagram may be implemented in the in the computing device 1100 of FIG. 11 below, or the computer readable medium 1200 of FIG. 12 below. For ease of description, the present techniques may be described using a single direction for detection of edges, correction of edges, and subsequent scaling of the edges. However, the present techniques apply scaling in each of a vertical direction and a horizontal direction. Additionally, note that the present techniques are hardware efficient. In particular, the present techniques may be realized through the addition of logical adds and shifts for detection (no multipliers) and through variations of bilinear interpolations for scaling when compared to traditional scaling solutions.

The edge-aware upscaling methodology is applied as a two-step process—first, detection of areas of interest and second, applying the linear scaling variations to the areas of interest as a correction. The detection and correction may be performed on both edges with a vertical direction and edges with a horizontal direction. In embodiments, the edge direction is calculated as the direction of a unit vector that is perpendicular to the edge normal. The edge normal may be a unit vector in the direction of a maximum intensity change. The present techniques include vertical detection 106, vertical scaling 108, horizontal detection 110, and horizontal scaling 112.

In vertical detection 106 and horizontal detection 110, pixels are identified in the periphery of an edge based on analysis of the particular image content. The edge pixels include those pixels leading to an edge and pixels waning away from the edge. Generally, both the vertical detection 106 and horizontal detection 110 are applied to screen content, text, or gaming content. No detections occur on natural video. Although vertical detection 106 is illustrated as occurring prior to horizontal detection 110, the vertical detection 106 and the horizontal detection 110 may occur in any order.

At potential edge detection 120 during vertical detection 106, all pixels of interest are isolated. In embodiments, the potential edge detection 120 convolves the input image with three 3×3 Sobel edge detectors, which summed and thresholded to identify potential edge pixels. The Sobel edge detectors may be the Sobel matrices 200 of FIG. 2. The pixels of interest may be detected as potential vertical edges. By detecting the pixels of interest as potential vertical edges, subsequent edge detection and correction is applied to the potential vertical edges and not the entire input image.

Figure 3:
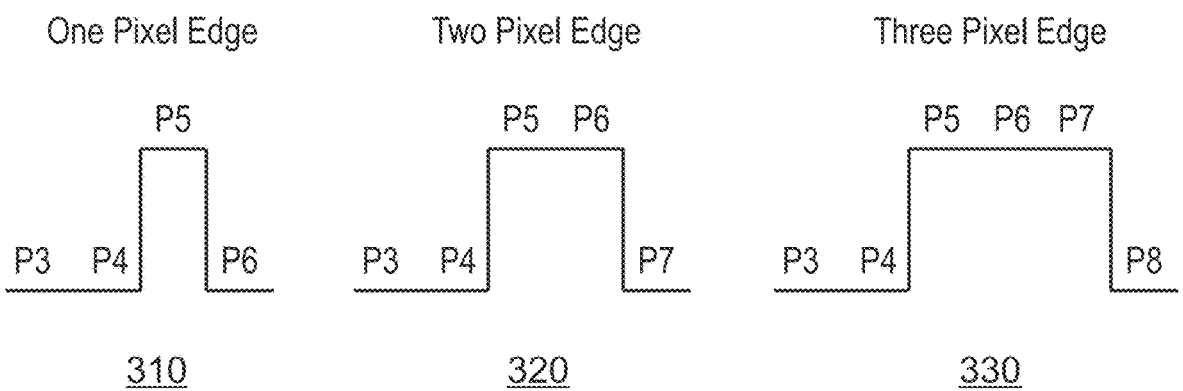
FIG. 3 is an illustration of thin-edges.
Figure 5:
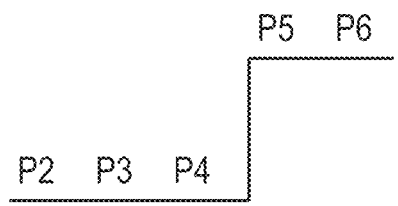
FIG. 5 is an illustration of one-directional edges.
Figure 5:
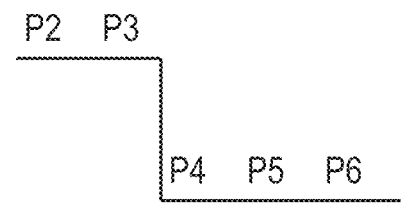

At thin-edge edge detection 122, vertical edges are detected as a one-, two-, or three-pixel edge as discussed with respect to FIG. 3. One-directional edge detection 124 determines if the pixel is a one-directional edge, as illustrated in FIG. 5. If a pixel is not classified as a thin-edge pixel during edge detection 122, the edge detection 124 determines if the pixel is a one-directional edge. At horizontal correlation detection 126, if the current pixel is not a thin-edge pixel or a one-directional edge pixel, it is determined if the pixel belongs to a strong horizontal edge. Generally, strong directional content occurs in areas where there is a correlation of pixels in a specific direction. Accordingly, a pixel has strong directional content in a particular direction when other neighboring pixels exhibit the same directional content, creating a directional correlation across a group of pixels. As used herein, a strong horizontal edge is a consistent correlation of pixels (not just one or two) across a neighborhood of pixels in the horizontal direction. The thin-edges, one-directional edges, and strongly correlated edges may be further classified as a leading edge or a falling edge as described below. Once all pixels are detected that belong to thin-edges, one-directional edges, and strongly correlated edges, and the potential edge pixels are classified as leading-edge or fading-edge pixels, vertical scaling 108 is applied. During vertical scaling 108, a correction 130 is applied to each pixel according to the edge type and classification. During correction, for the detected potential edges, the pixel values for the target output image are overridden with a linear output according to the edge type and classification. Accordingly, in embodiments the present techniques derive pixel values for an upscaled target output image that function as substitute values for another reconstruction filter. The reconstruction filter may be, for example, a nearest neighbor interpolation, bilinear interpolation, bicubic interpolations, Sinc resampling, Lanczos resampling, Fourier based interpolations.

After vertical detection 106 and vertical scaling 108, horizontal detection 110 and horizontal scaling are performed in a similar fashion. At potential edge detection 140 during horizontal detection 110, all pixels of interest are isolated. In embodiments, the potential edge detection 140 convolves the input image with three 3×3 Sobel edge detectors, which summed and thresholded to identify potential edge pixels. The Sobel edge detectors may be the Sobel matrices 200 of FIG. 2. The pixels of interest may be detected as potential horizontal edges. By detecting the pixels of interest as potential horizontal edges, subsequent edge detection and correction is applied to the potential horizontal edges and not the entire input image.

At thin-edge edge detection 142, horizontal edges are detected as a one-, two-, or three-pixel edge as discussed with respect to FIG. 3. One-directional edge detection 144 determines if the pixel is a one-directional edge, as illustrated in FIG. 5. If a pixel is not classified as a thin-edge pixel during edge detection 142, the edge detection 144 determines if the pixel is a one-directional edge. At vertical correlation detection 146, if the current pixel is not a thin-edge pixel or a one-directional edge pixel, it is determined if the pixel belongs to a strong vertical edge. As used herein, a strong vertical edge is a consistent correlation of pixels (not just one or two) across a neighborhood of pixels in the vertical direction. The thin-edges, one-directional edges, and strongly correlated edges may be further classified as a leading edge or a falling edge as described below. Once all pixels are detected that belong to thin-edges, one-directional edges, and strongly correlated edges, and the potential edge pixels are classified as leading-edge or fading-edge pixels, horizontal scaling 112 is applied. During horizontal scaling 112, a correction 150 is applied to each pixel according to the edge type and classification. During correction, for the detected potential edges, the pixel values for the target output image are overridden with a linear output according to the edge type and classification. Similar to vertical scaling, in embodiments the present techniques derive pixel values for an upscaled target output image that function as substitute values for another reconstruction filter. Again, the reconstruction filter may be, for example, a nearest neighbor interpolation, bilinear interpolation, bicubic interpolations, Sinc resampling, Lanczos resampling, Fourier based interpolations.

In examples, the final scaled image 104 is a combination target output pixel values that include: 1) for potential edges, the linear output pixel values obtained according to an edge type and classification and 2) for the remaining image, upscaling is done using any of a nearest neighbor interpolation, bilinear interpolation, bicubic interpolations, Sinc resampling, Lanczos resampling, or Fourier based interpolations. In embodiments, the scaling method used to obtain the linear output is a directional scalar. The scaling is applied first vertical direction to reach a final vertical resolution, followed by scaling along the horizontal direction to reach the intended final resolution. The present techniques apply the detection and correction algorithms to each direction of scaling.

FIG. 2 is an illustration of 3×3 Sobel matrices 200. To identify potential edges at potential edge detection 120 and potential edge detection 140 (FIG. 1), the input image is convolved with three 3×3 Sobel Edge Detectors, summed, and thresholded to identify potential edge pixels. Edge detection is performed using 2×3 Sobel Matrices and in K different directions for four possible angles Vertical 202, Horizontal 204, forty-five degrees 206, and one-hundred thirty-five degrees 208. In embodiments, the potential edge detection 120 and potential edge detection 140 isolate the pixels of interest for further processing rather than applying the thin-edge detection, one-directional edge detection, and strongly correlated edge detection to all pixels in the input image. For vertical potential edge detection 120 (FIG. 1), the input image is convolved with the horizontal matrix 204, forty-five-degree matrix 206, and one-hundred thirty-five-degree matrix to detect horizontal and angled edges. For horizontal potential edge detection 140 (FIG. 1), the input image is convolved with the vertical matrix 202, forty-five-degree matrix 206, and one-hundred thirty-five-degree matrix to detect vertical and angled edges. The Sobel convolutions are computed, summed and compared to a programmable EdgeThreshold to identify potential edge pixels in the image. The thresholds as described herein may be programmable based on the content and a desired output quality.

Figure 4:
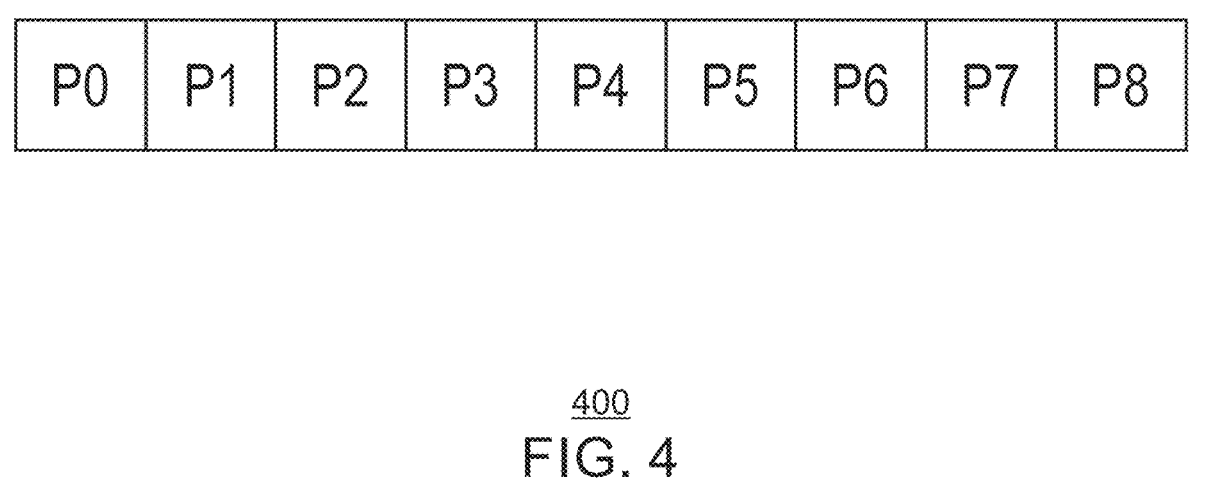

FIG. 3 is an illustration of thin-edges 300. For every potential edge pixel found during vertical potential edge detection 120 or horizontal potential edge detection 140, thin-edges are detected. This may be performed, for example, at vertical thin-edge detection 122 or horizontal thin-edge detection 142. For ease of description, edges with a thinness of one-pixel, two-pixel and three-pixels are described as thin-edges. However, this is a design choice and can be changed according to the particular application. The number refers to a thinness, in numbers of pixels, detected as an edge. FIG. 4 is an illustration of a linear array of pixels 400. The linear array of pixels may extend parallel to the direction of scaling. For each direction of scaling, a linear array of is input to the thin-edge detection 122/142. The linear array of pixels 400 includes nine pixels numbered P0 through P8 in the direction of scaling, with P4 being the center/current pixel i.

A leading edge may be defined as a pixel where the potential edge begins. Similarly, a fading edge may be defined as a pixel where the potential edge ends. To identify leading edge pixels, pixel differences are computed for the linear array of pixels. A pixel difference as used herein is a change in luma values between immediate/adjacent pairs of pixels of the linear array of pixels in the direction of scaling. For a linear array of N pixels, there are N−1 pixel differences. A pixel difference may be calculated as follows:

$$\text{OnePixelDiff}_{i,j} = |\text{Pixel}_i - \text{Pixel}_j|$$

where pixel i and pixel j are pixels in a linear array of pixels.

Referring again to FIG. 3, a one-pixel edge is illustrated at reference number 310. A current pixel i is a leading edge (LE) pixel from a linear array of nine pixels for a one-pixel edge if the following is true:

$$\text{OnePixelDiff}_{P_{i-1},P_i} \leq \text{LELowThreshold} \&\&$$
$$\text{OnePixelDiff}_{P_i,P_{i+1}} \geq \text{LEHighThreshold} \&\&$$
$$\text{OnePixelDiff}_{P_i,P_{i+2}} \leq \text{LELowThreshold} \quad \text{Eq. 1}$$

The LELowThreshold and LELowThreshold define a range of luma changes, and conditions with respect to these thresholds are used to determine if the current pixel i is a leading edge (LE) pixel of a thin-edge. Generally, the LELowThreshold and LELowThreshold are programmable. Consider an example where the current pixel i is pixel P4 of the linear array of pixels 400. Equation 1 when pixel i is pixel P4 is as follows:

$$\text{OnePixelDiff}_{P_3,P_4} \leq \text{LELowThreshold} \&\&$$
$$\text{OnePixelDiff}_{P_4,P_5} \geq \text{LEHighThreshold} \&\&$$
$$\text{OnePixelDiff}_{P_4,P_6} \leq \text{LELowThreshold} \quad \text{Eq. 2}$$

Accordingly, if (1) a pixel difference between the current pixel and the immediately preceding pixel is less than a low threshold; (2) a pixel difference between the current pixel and the first immediately subsequent pixel is greater than a high threshold; and (3) a pixel difference between the current pixel and the second immediately subsequent pixel is lower than a low threshold; then the current pixel P4 is a leading edge pixel. Put another way, if the difference in luma between the current pixel P4 and its immediate neighbors pixel P3 and pixel P5 is large enough to be considered an abrupt change, and the difference in luma between current pixel P4 and the second immediately subsequent pixel P6 is low enough to indicate a return to previous luma values.

In FIG. 3, a two-pixel edge is illustrated at reference number 320. A current pixel i is a leading edge (LE) pixel from a linear array of nine pixels for a two-pixel edge, the following is true:

$$\text{OnePixelDiff}_{P_{i-1},P_i} \leq \text{LELowThreshold} \&\&$$
$$\text{OnePixelDiff}_{P_i,P_{i+1}} \geq \text{LEHighThreshold} \&\&$$
$$(\text{OnePixelDiff}_{P_{i+1},P_{i+2}} \leq \text{LELowThreshold} ||$$
$$\text{OnePixelDiff}_{P_i,P_{i+2}} \geq \text{LEHighThreshold}) \&\&$$
$$\text{OnePixelDiff}_{P_i,P_{i+3}} \leq \text{LELowThreshold} \quad \text{Eq. 3}$$

Consider an example where the current pixel i is pixel P4 of the linear array of pixels 400. Equation 3 when pixel i is pixel P4 is as follows:

$$\text{OnePixelDiff}_{P_3,P_4} \leq \text{LELowThreshold} \&\&$$
$$\text{OnePixelDiff}_{P_4,P_5} \geq \text{LEHighThreshold} \&\&$$
$$(\text{OnePixelDiff}_{P_5,P_6} \leq \text{LELowThreshold} ||$$
$$\text{OnePixelDiff}_{P_4,P_6} \geq \text{LEHighThreshold}) \&\&$$
$$\text{OnePixelDiff}_{P_4,P_7} \leq \text{LELowThreshold} \quad \text{Eq. 4}$$

Accordingly, if (1) a pixel difference between the current pixel and the immediately preceding pixel is less than a low threshold; (2) a pixel difference between the current pixel and the first immediately subsequent pixel is greater than a high threshold; (3) a pixel difference between the first immediately subsequent pixel and the second immediately subsequent pixel is lower than a low threshold OR a pixel difference between the current pixel and the second immediately subsequent pixel; AND (4) a pixel difference between the current pixel and the third immediately subsequent pixel is greater than a low threshold, then P4 is a leading edge pixel of a two-pixel edge.

Put another way, for a two-pixel edge, the difference in luma between the current pixel P4 and its immediate neighbor's pixel P3 is large enough to be considered an abrupt change. The difference in luma between the current pixel P4 and the first immediate subsequent pixel P5 is greater than or equal to the high threshold. Additionally, either the difference in luma between the first immediate subsequent pixel P5 and the second immediate subsequent pixel P6 is less than or equal to a low threshold OR the difference in luma between the current pixel P4 and the second immediate subsequent pixel P6 is greater than or equal to the high threshold. Finally, the difference in luma between current pixel P4 and the third immediately subsequent pixel P7 is low enough to indicate a return to previous luma values.

In FIG. 3, a three-pixel edge is illustrated at reference number 330. A current pixel i is a leading edge (LE) pixel from a linear array of nine pixels for a three-pixel edge, if the following is true:

$$\text{OnePixelDiff}_{P_{i-1},P_i} \leq \text{LELowThreshold} \ \&\&$$
$$\text{OnePixelDiff}_{P_i,P_{i+1}} \geq \text{LEHighThreshold} \ \&\&$$
$$(\text{OnePixelDiff}_{P_{i+1},P_{i+2}} \leq \text{LELowThreshold} \|$$
$$\text{OnePixelDiff}_{P_i,P_{i+2}} \geq \text{LEHighThreshold}) \ \&\&$$
$$(\text{OnePixelDiff}_{P_{i+2},P_{i+3}} \leq \text{LELowThreshold} \|$$
$$\text{OnePixelDiff}_{P_i,P_{i+3}} \geq \text{LEHighThreshold}) \ \&\&$$
$$\text{OnePixelDiff}_{P_i,P_{i+4}} \leq \text{LELowThreshold} \quad \text{Eq. 5}$$

Consider an example where the current pixel i is pixel P4 of the linear array of pixels 400. Equation 5 when pixel i is pixel P4 is as follows:

$$\text{OnePixelDiff}_{P_3,P_4} \leq \text{LELowThreshold} \ \&\&$$
$$\text{OnePixelDiff}_{P_4,P_5} \geq \text{LEHighThreshold} \ \&\&$$
$$(\text{OnePixelDiff}_{P_5,P_6} \leq \text{LELowThreshold} \|$$
$$\text{OnePixelDiff}_{P_4,P_6} \geq \text{LEHighThreshold}) \ \&\&$$
$$(\text{OnePixelDiff}_{P_6,P_7} \leq \text{LELowThreshold} \|$$
$$\text{OnePixelDiff}_{P_4,P_7} \geq \text{LEHighThreshold}) \ \&\&$$
$$\text{OnePixelDiff}_{P_4,P_8} \leq \text{LELowThreshold} \quad \text{Eq. 6}$$

For a three-pixel edge, if (1) a pixel difference between the current pixel and the immediately preceding pixel is less than a low threshold; (2) a pixel difference between the current pixel and the first immediately subsequent pixel is greater than a high threshold; (3) a pixel difference between the first immediately subsequent pixel and the second immediately subsequent pixel is lower than a low threshold OR a pixel difference between the current pixel and the second immediately subsequent pixel; (4) a pixel difference between the second immediate subsequent pixel and the third immediate subsequent pixel is lower than or equal to a low threshold OR a pixel difference between the current pixel and the third immediate subsequent pixel is greater than or equal to a high threshold; AND (5) a pixel difference between the current pixel and the fourth immediately subsequent pixel is less than or equal to a low threshold, then P4 is a leading edge pixel of a three-pixel thin-edge.

Put another way, for a leading-edge pixel of a three-pixel edge, the difference in luma between the current pixel P4 and its immediate neighbor pixel P3 is large enough to be considered an abrupt change. The difference in luma between the current pixel P4 and the first immediate subsequent pixel P5 is greater than or equal to the high threshold. Additionally, either the difference in luma between the first immediate subsequent pixel P5 and the second immediate subsequent pixel P6 is less than or equal to a low threshold OR the difference in luma between the current pixel P4 and the second immediate subsequent pixel P6 is greater than or equal to the high threshold. Furthermore, either the difference in luma between the second immediate subsequent pixel (P6) and the third immediate subsequent pixel (P7) is less than or equal to a low threshold OR the difference in luma between the current pixel P4 and the third immediate subsequent pixel P7 is greater than or equal to the high threshold. Finally, the difference in luma between current pixel P4 and the fourth immediate subsequent pixel P7 is lower than or equal to the low threshold, which is enough to indicate a return to previous luma values. This abrupt change at pixel current pixel P4 continues in some form with pixels P5 and P6, and ends at pixel P7, which indicates that pixel P4 is the beginning of a three-pixel edge that includes pixels P5 and P6.

Similar to the leading edge, a fading edge may be defined as a pixel where the potential edge ends. To identify fading edge pixels, pixel differences are computed for the linear array of pixels, however the differences calculated use pixels that are a mirror image of pixels used to calculate leading edge pixels. A current pixel i is a fading edge (FE) pixel from a linear array of nine pixels for a one-pixel edge if the following is true:

$$\text{OnePixelDiff}_{P_{i+1},P_i} \leq \text{FELowThreshold} \ \&\&$$
$$\text{OnePixelDiff}_{P_i,P_{i-1}} \geq \text{FEHighThreshold} \ \&\&$$
$$\text{OnePixelDiff}_{P_i,P_{i-2}} \leq \text{FELowThreshold} \quad \text{Eq. 7}$$

A current pixel i is a fading edge (FE) pixel from a linear array of nine pixels for a two-pixel edge, the following is true:

$$\text{OnePixelDiff}_{P_{i+1},P_i} \leq \text{FELowThreshold} \ \&\&$$
$$\text{OnePixelDiff}_{P_i,P_{i-1}} \geq \text{FEHighThreshold} \ \&\&$$
$$(\text{OnePixelDiff}_{P_{i-1},P_{i-2}} \leq \text{FELowThreshold} \|$$
$$\text{OnePixelDiff}_{P_i,P_{i-2}} \geq \text{FEHighThreshold}) \ \&\&$$
$$\text{OnePixelDiff}_{P_i,P_{i-3}} \leq \text{FELowThreshold} \quad \text{Eq. 8}$$

A current pixel i is a fading edge (FE) pixel from a linear array of nine pixels for a three-pixel edge, if the following is true:

$$\text{OnePixelDiff}_{P_{i+1},P_i} \leq \text{FELowThreshold} \ \&\&$$
$$\text{OnePixelDiff}_{P_i,P_{i-1}} \geq \text{FEHighThreshold} \ \&\&$$
$$(\text{OnePixelDiff}_{P_{i-1},P_{i-2}} \leq \text{FELowThreshold} \|$$
$$\text{OnePixelDiff}_{P_i,P_{i-2}} \geq \text{FEHighThreshold}) \ \&\&$$
$$(\text{OnePixelDiff}_{P_{i-2},P_{i-3}} \leq \text{FELowThreshold} \|$$
$$\text{OnePixelDiff}_{P_i,P_{i-3}} \geq \text{FEHighThreshold}) \ \&\&$$
$$\text{OnePixelDiff}_{P_i,P_{i-4}} \leq \text{FELowThreshold} \quad \text{Eq. 9}$$

Accordingly, with respect to thin-edge pixels, a fading-edge pixel can be found using math similar to that used to determine leading edge pixels as discussed above. Generally, the FELowThreshold and FEHighThreshold are programmable and define a range of luma changes.

If the pixel has been identified as a potential edge pixel at potential edge detection 120/140 and was not identified as a thin edge pixel during thin edge detection 122/142, the potential edge pixel is evaluated to determine if it is a one-directional edge pixel. FIG. 5 is an illustration of one-directional edges 500. A one-directional edge-pixel is a pixel in a neighborhood of pixels where in the direction of scaling, there is a one-time directional intensity change. A one-directional leading edge 402 is illustrated. A one-directional fading edge 404 is illustrated.

A one-directional leading edge may be determined as follows:

$$\text{OnePixelDiff}_{P_{i-1},P_i} \leq \text{LELowThreshold} \&\&$$
$$\text{OnePixelDiff}_{P_{i-2},P_i} \leq \text{LELowThreshold} \&\&$$
$$\text{OnePixelDiff}_{P_i,P_{i+1}} \leq \text{LEHighThreshold} \&\&$$
$$\text{OnePixelDiff}_{P_i,P_{i+2}} \geq \text{LEHighThreshold} \quad \text{Eq. 10}$$

A one-directional fading edge may be determined as follows:

$$\text{OnePixelDiff}_{P_i,P_{i+1}} \leq \text{FELowThreshold} \&\&$$
$$\text{OnePixelDiff}_{P_i,P_{i+2}} \leq \text{FELowThreshold} \&\&$$
$$\text{OnePixelDiff}_{P_{i-1},P_i} \geq \text{FEHighThreshold} \&\&$$
$$\text{OnePixelDiff}_{P_{i-2},P_i} \geq \text{FEHighThreshold} \quad \text{Eq. 11}$$

If the current potential edge pixel as identified by edge detection 120/140 is not identified as a thin-edge at edge detection 122/124, and is not identified as a one-directional edge at edge detection 124/144, any strong correlations are detected via edge detection 126/146 for the current potential edge. The present techniques detect if the pixel belongs to a strong horizontal or vertical edge. FIG. 6 is an illustration of a window of pixels 600, numbered pixel P00 through P44. To identify strong directional content, a window of pixels is evaluated. A current pixel P22 is the center/current pixel. Correlations may be a direction classification as either horizontal or vertical.

Consider vertical correlation detection 126. During vertical correlation detection 126, horizontal edges are detected since the scaling will occur perpendicular to the edge. Similarly, in horizontal correlation detection 146, vertical edges are identified since the scaling will occur perpendicular to the edge.

In the example of vertical correlation detection 126, to identify horizontal edges, an absolute difference of pixels above the center pixel is computed for locations P21, P22 & P23 as follows.

$$\text{PixDiffMinus}_{P_{21}} = \text{OnePixDiff}_{P_{01},P_{11}} + \text{OnePixDiff}_{P_{11},P_{21}} \quad \text{Eq. 12}$$

$$\text{PixDiffMinus}_{P_{22}} = \text{OnePixDiff}_{P_{02},P_{12}} + \text{OnePixDiff}_{P_{12},P_{22}} \quad \text{Eq. 13}$$

$$\text{PixDiffMinus}_{P_{23}} = \text{OnePixDiff}_{P_{03},P_{13}} + \text{OnePixDiff}_{P_{13},P_{23}} \quad \text{Eq. 14}$$

$$\text{PixDiffPlus}_{P_{21}} = \text{OnePixDiff}_{P_{41},P_{31}} + \text{OnePixDiff}_{P_{31},P_{21}} \quad \text{Eq. 15}$$

$$\text{PixDiffPlus}_{P_{22}} = \text{OnePixDiff}_{P_{42},P_{32}} + \text{OnePixDiff}_{P_{32},P_{22}} \quad \text{Eq. 16}$$

$$\text{PixDiffPlus}_{P_{23}} = \text{OnePixDiff}_{P_{43},P_{33}} + \text{OnePixDiff}_{P_{33},P_{32}} \quad \text{Eq. 17}$$

In naming variables discussed herein, "minus" refers to one side across the center pixel, and "plus" refers to the other side across the center pixel. A leading edge may be determined as follows:

$$\text{PixDiffMinus\_P22} \leq \text{SLELowThreshold} \&\&$$
$$(\text{PixDiffMinus}_{P_{21}} \leq \text{SLELowThreshold} \|$$
$$\text{PixDiffMinus\_P23} \leq \text{SLELowThreshold}) \&\&$$
$$\text{OnePixDiff}_{P_{22},P_{32}} \geq \text{LEHighThreshold} \&\&$$
$$\text{OnePixelDiff}_{P_{21},P_{31}} \geq \text{LEHighThreshold} \|$$
$$\text{OnePixelDiff}_{P_{23},P_{33}} \quad \text{Eq. 18}$$

A fading edge may be determined as follows:

$$\text{PixDiffMinus\_P22} \leq \text{SFELowThreshold} \&\&$$
$$(\text{PixDiffMinus}_{P_{21}} \leq \text{SFELowThreshold} \|$$
$$\text{PixDiffMinus\_P23} \leq \text{SFELowThreshold}) \&\&$$
$$\text{OnePixDiff}_{P_{22},P_{12}} \geq \text{FEHighThreshold} \&\&$$
$$\text{OnePixelDiff}_{P_{21},P_{11}} \geq \text{LEHighThreshold} \|$$
$$\text{OnePixelDiff}_{P_{23},P_{13}} \quad \text{Eq. 19}$$

Here, SLELowThreshold and SFELowThreshold are programmable. Additionally, during correlation detection corner pixels in strong horizontal content are also detected.

In embodiments, after completion of the detection of potential edges, detection of the edge type, and classification of the edges as a leading edge or falling edge, isolated detections are removed. In particular, isolated detections discovered in thin-edge detection 122/142, one-directional edge detection 124/144, or correlation detection 126/146, isolated detections are removed from further processing. This ensures uniformity in detections and eliminates false detections.

To remove the isolated detections, for every pixel marked as a leading/fading-edge in thin-edge detection 122/142, one-directional edge detection 124/144, or correlation detection 126/146, a neighborhood of pixels in the direction of scaling is evaluated. In embodiments, the neighborhood of pixels is 3×5 for vertical scaling and 5×3 for horizontal scaling. The number of detected leading/fading-edges in each neighborhood is summed. If the total number of detected edges is greater than one, then the current pixel is not removed as an edge pixel. Otherwise, the detected pixel is dropped or removed from further processing.

Potential edge pixels are typed as a thin-edge pixel, one-directional edge pixel, or a strongly correlated pixel. Each potential edge pixel is also classified as a leading-edge pixel or a fading edge pixel. As described below, pixels may be corrected according to the particular type of pixel or the classification of the pixel. Correction according to the present techniques includes various bilinear scaling proposals, and the inputs to the bilinear filter are dependent on the map-back location of the output pixel in the input image.

The correction as described herein outputs a pixel value derived from bilinear interpolation for the integer component of the current pixel and another pixel according to the edge type. As used herein, bilinear interpolation interpolates pixel values from two pixels. For example, bilinear interpolation may find a weight average of two pixels as $$\text{Output} = \frac{a*x + b*(256-x)}{256}.$$

Based on type of edge detected, the correction described herein falls into three categories/types: (1) Bilinear Minus, which is a bilinear interpolation using the pixel values of a current pixel i and previous pixel i−1; (2) Bilinear Plus, which is a bilinear interpolation using the pixel values of the current pixel i and the next pixel i+1; and (3) Bilinear PlusPlus, which is bilinear interpolation using the pixel values of the current pixel i & second next pixel i+2.

The corrections are derived for each pixel in the target output image. When an image is scaled, typically a target output pixel does not lie at an input image pixel location. Instead, the pixels of the target output image typically correspond to a location between neighboring input image pixels. Bilinear interpolation computes a pixel value of the target output image by locating each pixel in the target output image in the image plane. A geometric transform identifies each target output pixel in the target output image with a corresponding location in the input image. Thus, the transform maps a pixel of the target output image to the input image. The mapping may be referred to as a source map with a number of points S. Generally, points of the source map do not correspond to a single pixel of the input image. Rather, source map locations are often expressed as a combination of an integer component and a fractional component. Therefore, the value assigned to a target output pixel (yOut) is computed as an interpolated combination of the input image pixel values closest to the corresponding point S in the source map, which includes an integer component (yInt) and a fractional component (yFrac). The source map point S may be identified based on the scaling factor in the direction of scaling.

The particular correction used for a target output pixel (yOut) is based on the edge type and classification of the input image pixel located at the integer component yInt of the corresponding source map point S. The fractional component yFrac may be used to further determine the particular interpolation used to derive a final value for the target output pixel (yOut). Thus, the correction is closely dependent on the integer and fractional mapping of the target output pixel in the source map.

Generally, the correction applied is based on the detected edge type and fractional value of the corresponding source map location. For each point S in the source map, the integer component yInt may directly correspond to a pixel of the input image. In particular, every pixel of the output image maps back to a location in the input image (based on the scale factor) and it creates a yInt (which is the integer part of the mapping) and yFrac (which is the fractional part of the mapping). Generally, if yFrac is 0, then yInt is a direct input pixel. If yFrac is non-zero, then the corresponding location is in between yInt and yPlus.

A next pixel (yPlus) of in source map S may be defined as yPlus=yInt+1. The next pixel (yPlus) of the source map also includes a respective integer component and a fractional component, where the integer component directly corresponds to a pixel of the input image. A previous pixel (yMinus) of the source map S may be defined as yMinus=yInt−1. The previous pixel yMinus of current pixel S also includes a respective integer component and a fractional component.

In the scenario where the corresponding input image pixel at the integer component of the source map location (yInt) is classified as a leading-edge pixel, correction is performed as follows. If the next pixel yPlus is a fading edge and the fractional portion yFrac<0.5, a bilinear minus output is used. Specifically, the pixel value of the target output pixel is calculated from the pixel values of the current pixel i & previous pixel i−1. If the next pixel yPlus is a fading edge and the fractional portion yFrac>0.5, a bilinear plus plus output is used. Specifically, the pixel value of the target output pixel is calculated from using the pixel values of the current pixel i & second immediate subsequent pixel i+2. For all other cases when the integer component of the source map location (yInt) is a leading-edge pixel, if the fractional portion yFrac<0.5, a bilinear minus output is used.

In the scenario where the corresponding input image pixel at the integer component of the source map location (yInt) is a fading-edge pixel, correction is performed using the bilinear plus output, regardless of the value of the fractional portion yFrac. Accordingly, for target output pixels that map to an integer component of the source map location (yInt) that is identified in the input image as a fading edge, the pixel value is calculated from the pixel values of the current pixel i & first immediate subsequent pixel i+1.

In the scenario where the corresponding input image pixel at the integer component of the source map location (yInt) is neither a leading-edge pixel nor a fading edge pixel, correction is performed as follows. If the next pixel yPlus is a fading edge and the fractional portion yFrac>0.5, a bilinear plus plus output is used. Specifically, the pixel value of the target output pixel is calculated from the pixel values of the current pixel i & second immediate subsequent pixel i+2. If the next pixel yPlus is a leading edge, a bilinear plus output is used. Specifically, when the source map location is neither a leading-edge pixel or fading edge pixel and the next pixel is a leading edge, the pixel value of the target output pixel is calculated from the pixel values of the current pixel i & first immediate subsequent pixel i+1. For all other cases, when the previous pixel (yMinus) is a fading-edge pixel, if the fractional portion yFrac<0.5, a bilinear minus output is used.

Figure 7:
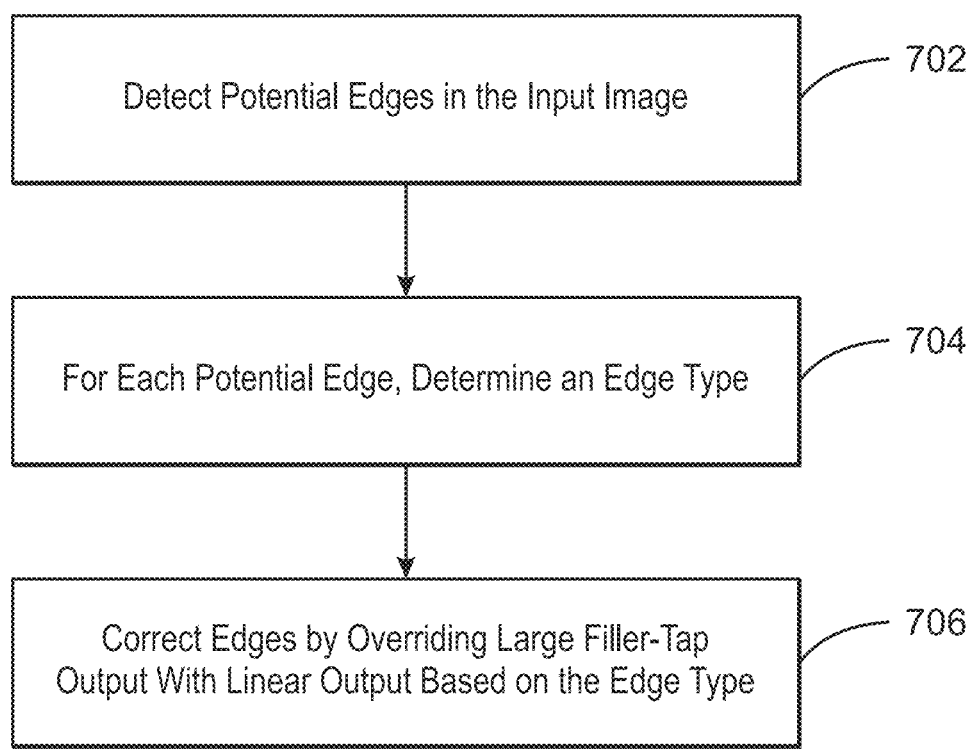
FIG. 7 is a process flow diagram of a method that implements edge aware upscaling for improved screen content quality.

FIG. 7 is a process flow diagram of a method 700 for edge aware upscaling for improved screen content quality. The method 700 may be implemented in the computing device 1100 of FIG. 11 below, or the computer readable medium 1200 of FIG. 12 below. For ease of description the present techniques may be described as generally referring to scaling. However, the present techniques apply scaling in each of a vertical direction and a horizontal direction.

At block 702, potential edges are detected in the input image. The input image includes screen content. In embodiments, various edge detection techniques may be used to determine potential edges in the input image. The edge detection techniques may include the use of a Sobel filter to extract edges for potential additional processing. Accordingly, pixels from the input image that form these extracted edges may be referred to potential edges or potential edge pixels.

At block 704, for each potential edge or potential edge pixel an edge type is determined. In particular, each potential edge pixel may be detected as a thin-edge pixel, a one-directional edge pixel, a strong edge pixel, or none of the aforementioned edge types. Moreover, within each detected edge type, the pixel may be classified as a leading-edge pixel or a fading edge pixel. A potential pixel may also be classified as a leading-edge or a fading-edge pixel without a detected edge type.

At block 706, each potential edge is corrected by overriding large filter tap outputs with a linear output based on the edge type and classification. The linear output may be a variation of bilinear interpretation using two pixels from the input image. The particular pixels of the input image used in bilinear interpolation are based on a type of edge detected at the potential edges as well as if the edges are identified as a leading edge or falling edge.

This process flow diagram is not intended to indicate that the blocks of the example method 700 are to be executed in any particular order, or that all of the blocks are to be included in every case. Further, any number of additional blocks not shown may be included within the example method 700, depending on the details of the specific implementation.

Figure 8:
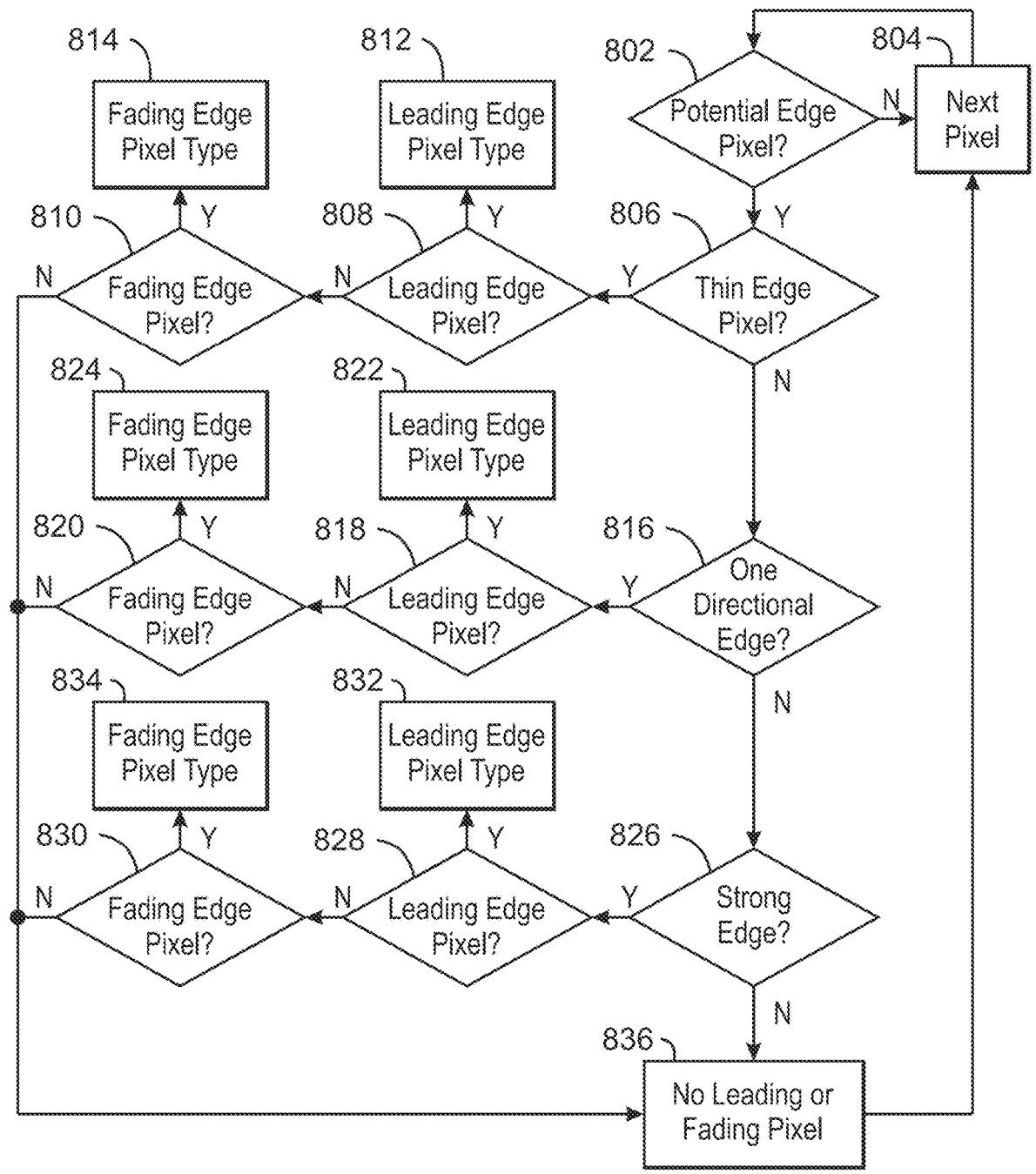
FIG. 8 is a process flow diagram of a method for potential edge detection during edge aware upscaling for improved screen content quality.

FIG. 8 is a process flow diagram of a method 800 for potential edge detection during edge aware upscaling for improved screen content quality. The method 800 may be implemented in the computing device 1100 of FIG. 11 below, or the computer readable medium 1200 of FIG. 12 below.

At block 802, it is determined if the pixel belongs to a potential edge. Potential edges may be detected through the use of a Sobel operator. If the pixel does not belong to a potential edge, process flow continues to block 804. At block 804, a next pixel is selected. If the pixel belongs to a potential edge, process flow continues to block flow continues to block 806.

At block 806, it is determined if the current pixel is a thin-edge pixel. In embodiments, thin-edge pixel is a pixel that forms a one, two, or three-pixel edge in the input image. If the pixel is a thin-edge pixel, process flow continues to block 808. If the pixel is not a thin-edge pixel, process flow continues to block 816. At block 808, it is determined if the current pixel is a leading-edge pixel. If the pixel is a leading-edge pixel, process flow continues to block 812 where the pixel is classified as a leading-edge pixel. If the pixel is not a leading-edge pixel, process flow continues to block 810. At block 810, it is determined if the current pixel is a fading-edge pixel. If the pixel is a fading edge pixel, process flow continues to block 814 where the pixel is classified as a fading-edge pixel type.

At block 816, it is determined if the current pixel is a one-directional pixel. If the pixel is a one-directional pixel, process flow continues to block 818. If the pixel is not a one-directional pixel, process flow continues to block 826. At block 818, it is determined if the current pixel is a leading-edge pixel. If the pixel is a leading-edge pixel, process flow continues to block 822 where the pixel is classified as a leading-edge pixel type. If the pixel is not a leading-edge pixel, process flow continues to block 820. At block 820, it is determined if the current pixel is a fading-edge pixel. If the pixel is a fading edge pixel, process flow continues to block 824 where the pixel is classified as a fading-edge pixel type.

At block 826, it is determined if the current pixel is a strong correlated pixel. If the pixel is a strong correlated pixel, process flow continues to block 828. If the pixel is not a strong correlated pixel, process flow continues to block 836. At block 828, it is determined if the current pixel is a leading-edge pixel. If the pixel is a leading-edge pixel, process flow continues to block 832 where the pixel is classified as a leading-edge pixel type. If the pixel is not a leading-edge pixel, process flow continues to block 830. At block 830, it is determined if the current pixel is a fading-edge pixel. If the pixel is a fading edge pixel, process flow continues to block 834 where the pixel is classified as a fading-edge pixel type. At block 836, the remaining pixels are classified as a leading edge or fading edge pixels. Process flow then returns to block 804 and another pixel is selected for processing.

This process flow diagram is not intended to indicate that the blocks of the example method 800 are to be executed in any particular order, or that all of the blocks are to be included in every case. Further, any number of additional blocks not shown may be included within the example method 800, depending on the details of the specific implementation.

Figure 9:
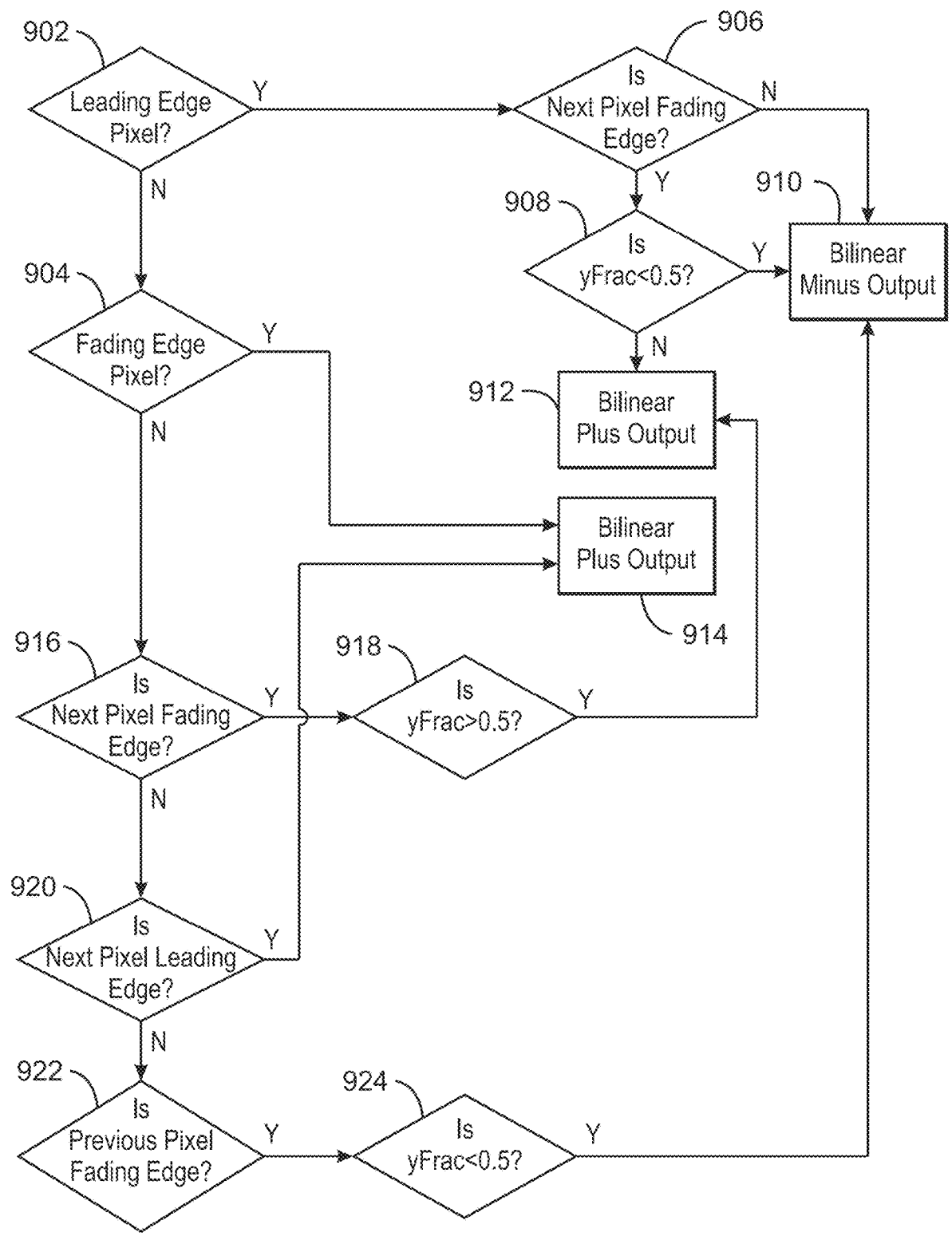
FIG. 9 is a process flow diagram of a method for correction during edge aware upscaling for improved screen content quality.

FIG. 9 is a process flow diagram of a method 900 for edge correction during edge aware upscaling for improved screen content quality. The method 900 may be implemented in the computing device 1100 of FIG. 11 below, or the computer readable medium 1200 of FIG. 12 below.

For edge correction, the current pixel used for correction is derived based on the scaling factor. For each target output image pixel yOut, a source map point S is found that maps the target output image to the input image. For the corresponding source map point S, the integer portion yInt of the source map point is used to find a pixel in the input image. The fractional portion yFrac of the source map point is used to tune the particular bilinear interpolation to determine the target output pixel value yOut.

In the example of FIG. 9, the "pixel" refers to the input pixel that corresponds to the integer component yInt of the source map point that maps to the current target output pixel from the target output image. The "next pixel" refers to the input pixel that corresponds to the integer component yInt of the source map point that maps to the next target output pixel from the target output image. The "previous pixel" refers to the input pixel that corresponds to the integer component yInt of the source map point that maps to the previous target output pixel from the target output image. At block 902, it is determined if the target output image pixel yOut is a leading-edge pixel. If the pixel is a leading-edge pixel, process flow continues to block 906. If the pixel is not a leading-edge pixel, process flow continues to block 904. At block 906, it is determined if the next pixel yPlus is a fading edge pixel. If the next pixel i+1 is not a fading-edge pixel, process flow continues to block 910. At block 910, bilinear minus output is used. Specifically, the pixel value of the target output pixel value yOut is calculated from the pixel values of the current pixel i & previous pixel i−1. If the next pixel i+1 is a fading-edge pixel, process flow continues to block 908. At block 908, it is determined if the fractional portion yFrac of the corresponding source map point is greater than 0.5. If the fractional portion yFrac is less than 0.5, process flow continues to block 910 where bilinear minus output is used as the target output pixel value yOut. If the fractional portion yFrac is greater than 0.5, process flow continues to block 912 where bilinear plus plus output is used as the target output pixel value yOut. Specifically, the pixel value of the target output pixel is calculated from using the pixel values of the current pixel i & second immediate subsequent pixel i+2.

At block 904, it is determined if the current pixel i is a fading edge pixel. If the current pixel i is a fading edge pixel, process flow continues to block 914 where bilinear plus output is used. Specifically, the pixel value of the target output pixel is calculated using the pixel values of the current pixel i and the first immediate subsequent pixel i+1. If the current pixel i is not a fading edge pixel, process flow continues to block 914 where bilinear plus output is used.

At block 920, it is determined if the next pixel is a leading-edge pixel. If the next pixel is a leading-edge pixel, process flow continues to block 914 where bilinear plus output is used. If the pixel is not a fading-edge pixel, process flow continues to block 922. At block 922, it is determined if the previous pixel is a fading edge pixel. If the previous pixel is a fading edge pixel, process flow continues to block 910 where bilinear minus output is used. If the previous pixel is not a fading edge pixel, there is no change or modification to the scaling performed. At block 924, it is determined if the fractional portion yFrac is less than 0.5. If the fractional portion the fractional portion yFrac greater than 0.5, there is no change or modification to the scaling performed.

This process flow diagram is not intended to indicate that the blocks of the example method 900 are to be executed in any particular order, or that all of the blocks are to be included in every case. Further, any number of additional blocks not shown may be included within the example method 900, depending on the details of the specific implementation.

Figure 10:
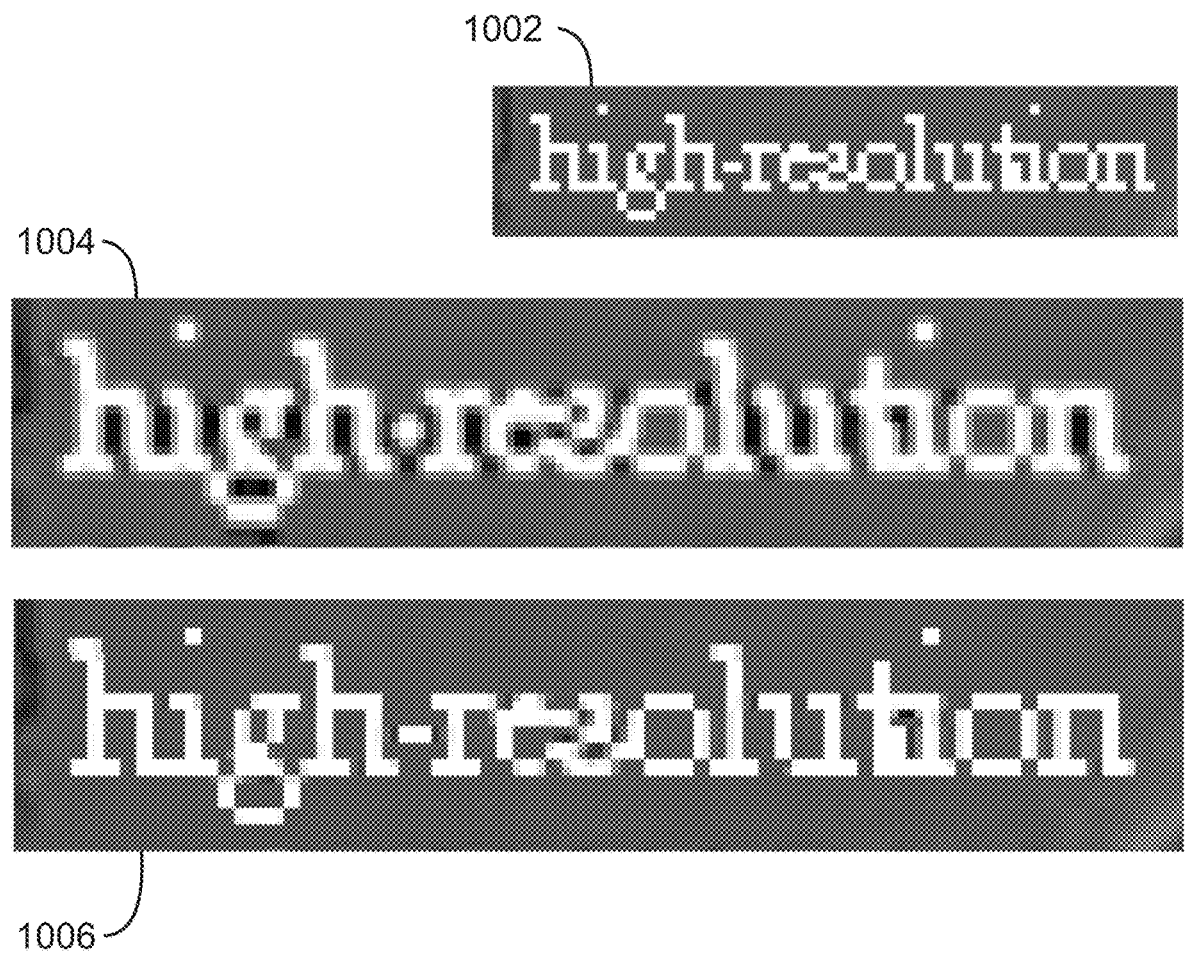
FIG. 10 is an illustration of a series of images.

FIG. 10 is a series of images 1000. The image 1002 is the input image 1002. The output image 1004 is upscaled using traditional upscaling techniques. The target output image yOut 1006 is the input image upscaled according to the present techniques. As illustrated, the target output image yOut 1006 has fewer artifacts in-between the edges and intensity bleeding across the edges, causing a sharper output when compared to the output image 1004.

Figure 11:
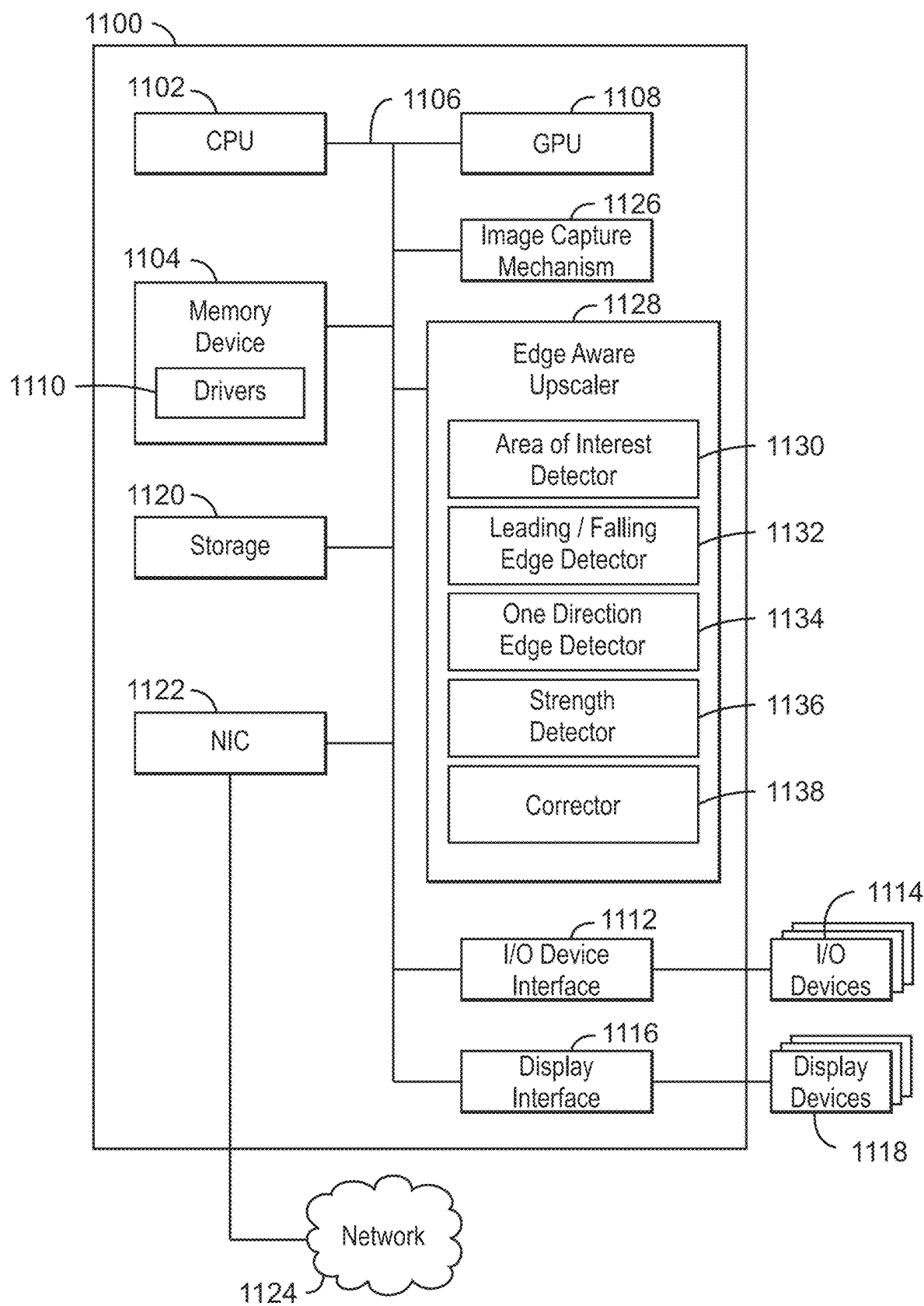
FIG. 11 is a block diagram of a system that enables edge aware upscaling for improved screen content quality.

Referring now to FIG. 11, a block diagram is shown of a system that enables edge aware upscaling for improved screen content quality. The computing device 1100 may be, for example, a laptop computer, desktop computer, tablet computer, mobile device, or wearable device, among others. The computing device 1100 may include a central processing unit (CPU) 1102 that is configured to execute stored instructions, as well as a memory device 1104 that stores instructions that are executable by the CPU 1102. The CPU 1102 may be coupled to the memory device 1104 by a bus 1106. Additionally, the CPU 1102 can be a single core processor, a multi-core processor, a computing cluster, or any number of other configurations. Furthermore, the computing device 1100 may include more than one CPU 1102. In some examples, the CPU 1102 may be a system-on-chip (SoC) with a multi-core processor architecture. In some examples, the CPU 1102 can be a specialized digital signal processor (DSP) used for image processing. The memory device 1104 can include random access memory (RAM), read only memory (ROM), flash memory, or any other suitable memory systems. For example, the memory device 1104 may include dynamic random-access memory (DRAM). The memory may include drivers 1110.

The computing device 1100 may also include a graphics processing unit (GPU) 1108. As shown, the CPU 1102 may be coupled through the bus 1106 to the GPU 1108. The GPU 1108 may be configured to perform any number of graphics operations within the computing device 1100. For example, the GPU 1108 may be configured to render or manipulate graphics images, graphics frames, videos, or the like, to be displayed to a viewer of the computing device 1100.

The CPU 1102 may also be connected through the bus 1106 to an input/output (I/O) device interface 1112 configured to connect the computing device 1100 to one or more I/O devices 1114. The I/O devices 1114 may include, for example, a keyboard and a pointing device, wherein the pointing device may include a touchpad or a touchscreen, among others. The I/O devices 1114 may be built-in components of the computing device 1100, or may be devices that are externally connected to the computing device 1100. In some examples, the memory 1104 may be communicatively coupled to I/O devices 1114 through direct memory access (DMA).

The CPU 1102 may also be linked through the bus 1106 to a display interface 1116 configured to connect the computing device 1100 to a display device 1116. The display devices 1118 may include a display screen that is a built-in component of the computing device 1100. The display devices 1118 may also include a computer monitor, television, or projector, among others, that is internal to or externally connected to the computing device 1100. The display device 1116 may also include a head mounted display.

The computing device 1100 also includes a storage device 1120. The storage device 1120 is a physical memory such as a hard drive, an optical drive, a thumbdrive, an array of drives, a solid-state drive, or any combinations thereof. The storage device 1120 may also include remote storage drives.

The computing device 1100 may also include a network interface controller (NIC) 1122. The NIC 1122 may be configured to connect the computing device 1100 through the bus 1106 to a network 1124. The network 1124 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1100 includes a content-based edge aware upscaler 1128. The content-based edge aware upscaler 1128 includes an area of interest detector 1130, a thin-edge detector 1132, a one-directional edge detector 1134, a strength detector 1136, and corrector 1138. The area of interest detector 1130 is configured to detect potential edges in an input image. The thin-edge detector 1132 is configured to detect thin edges among the potential edges. The one-directional edge detector 1134 is configured to detect one-directional edges from the potential edges not identified as thin-edges. The strength detector 1136 is configured to detect strongly correlated edges from the potential edges not identified as thin-edges or one-directional edges. The corrector 1138 is configured to correct the edges by applying variations of linear interpolations according to the edge type and classification.

The block diagram of FIG. 11 is not intended to indicate that the computing device 1100 is to include all of the components shown in FIG. 11. Rather, the computing device 1100 can include fewer or additional components not illustrated in FIG. 11, such as additional buffers, additional processors, and the like. The computing device 1100 may include any number of additional components not shown in FIG. 11, depending on the details of the specific implementation. Furthermore, any of the functionalities of the content-based edge aware upscaler 1128, area of interest detector 1130, thin-edge detector 1132, one-directional edge detector 1134, strength detector 1136, and corrector 1138 may be partially, or entirely, implemented in hardware and/or in the processor 1102. For example, the functionality may be implemented with an application specific integrated circuit, in logic implemented in the processor 1102, or in any other device. For example, the functionality of the content-based edge aware upscaler 1128 may be implemented with an application specific integrated circuit, in logic implemented in a processor, in logic implemented in a specialized graphics processing unit such as the GPU 1108, or in any other device.

Figure 12:
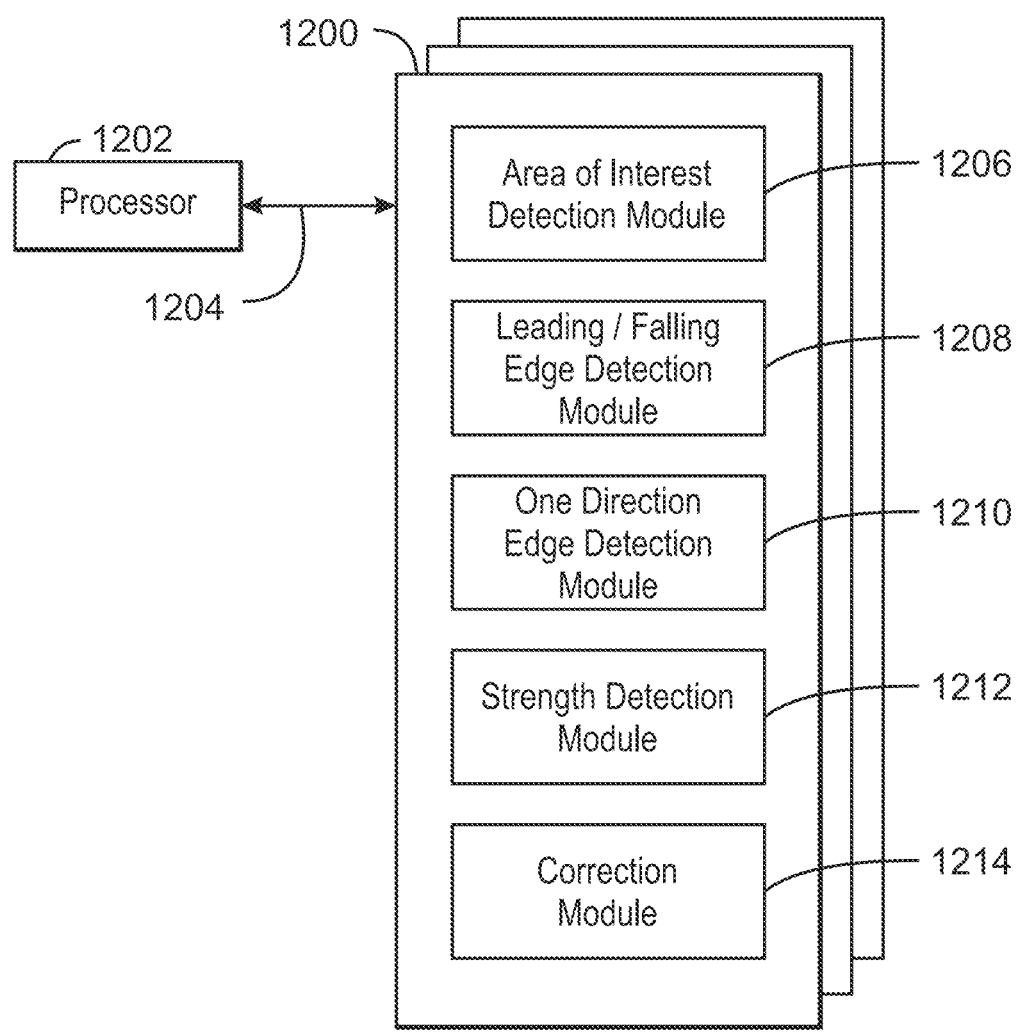
FIG. 12 is a block diagram showing computer readable media that stores code for edge aware upscaling for improved screen content quality.

FIG. 12 is a block diagram showing computer readable media 1200 that stores code for edge aware upscaling for improved screen content quality. The computer readable media 1200 may be accessed by a processor 1202 over a computer bus 1204. Furthermore, the computer readable medium 1200 may include code configured to direct the processor 1202 to perform the methods described herein. In some embodiments, the computer readable media 1200 may be non-transitory computer readable media. In some examples, the computer readable media 1200 may be storage media.

The various software components discussed herein may be stored on one or more computer readable media 1200, as indicated in FIG. 12. For example, an area of interest detection module 1206 may be configured to detect potential edges in an input image. A thin-edge detection module 1208 may be configured to detect thin edges among the potential edges. A one-directional edge detection module 1210 may be configured to detect one-directional edges from the potential edges not identified as thin-edges. A strength detection module 1212 is configured to detect strongly correlated edges from the potential edges not identified as thin-edges or one-directional edges. A correction module 1214 may be configured to correct the edges by applying variations of linear interpolations according to the edge type and classification The block diagram of FIG. 12 is not intended to indicate that the computer readable media 1200 is to include all of the components shown in FIG. 12. Further, the computer readable media 1200 may include any number of additional components not shown in FIG. 12, depending on the details of the specific implementation.

EXAMPLES

Example 1 is an apparatus for edge aware upscaling. The apparatus includes a potential edge detector to identify potential edge pixels in an input image; a thin-edge detector to detect thin edges in the potential edge pixels of the input image; a one-directional edge detector to detect one-directional edges in the potential edge pixels of the input image; a correlation detector to detect strongly correlated edges in the potential edge pixels of the input image; a corrector to derive a target output value, wherein the target output value is based on an edge type and classification of a corresponding input pixel as identified by a source map point.

Example 2 includes the apparatus of example 1, including or excluding optional features. In this example, in response to the target output pixel being classified as a leading-edge pixel, a next pixel being a fading edge pixel, and a fractional component of the source map point being less than 0.5, using bilinear minus output as the target output pixel value.

Example 3 includes the apparatus of any one of examples 1 to 2, including or excluding optional features. In this example, in response to the target output pixel being classified as a leading-edge pixel, a next pixel being a fading edge pixel, and a fractional component of the source map point being greater than 0.5, using bilinear plus plus output as the target output pixel value.

Example 4 includes the apparatus of any one of examples 1 to 3, including or excluding optional features. In this example, in response to the target output pixel being classified as a fading-edge pixel using bilinear minus output as the target output pixel value.

Example 5 includes the apparatus of any one of examples 1 to 4, including or excluding optional features. In this example, in response to the target output pixel being classified as neither a leading-edge pixel nor a fading-edge pixel, a next pixel being a fading edge pixel, and a fractional component of the source map point being greater than 0.5, using bilinear plus plus output as the target output pixel value.

Example 6 includes the apparatus of any one of examples 1 to 5, including or excluding optional features. In this example, in response to the target output pixel being classified as neither a leading-edge pixel nor a fading-edge pixel and a next pixel being a leading-edge pixel, using bilinear plus output as the target output pixel value.

Example 7 includes the apparatus of any one of examples 1 to 6, including or excluding optional features. In this example, in response to the target output pixel being classified as neither a leading-edge pixel nor a fading-edge pixel, a previous pixel being a fading edge pixel, and a fractional component of the source map point being less than 0.5, using bilinear minus output as the target output pixel value.

Example 8 includes the apparatus of any one of examples 1 to 7, including or excluding optional features. In this example, isolated detections/false positives are removed from the potential edges.

Example 9 includes the apparatus of any one of examples 1 to 8, including or excluding optional features. In this example, the potential edge pixels are identified via content analysis.

Example 10 includes the apparatus of any one of examples 1 to 9, including or excluding optional features. In this example, the target output value overrides generic resampling output value.

Example 11 is a method for edge aware upscaling. The method includes identifying potential edge pixels in an input image; detecting thin edges in the potential edge pixels of the input image; detecting one-directional edges in the potential edge pixels of the input image; detecting strongly correlated edges in the potential edge pixels of the input image; deriving a target output value based on an edge type and classification of a corresponding input pixel as identified by a source map point.

Example 12 includes the method of example 11, including or excluding optional features. In this example, in response to the target output pixel being classified as a leading-edge pixel, a next pixel being a fading edge pixel, and a fractional component of the source map point being less than 0.5, using bilinear minus output as the target output pixel value.

Example 13 includes the method of any one of examples 11 to 12, including or excluding optional features. In this example, in response to the target output pixel being classified as a leading-edge pixel, a next pixel being a fading edge pixel, and a fractional component of the source map point being greater than 0.5, using bilinear plus plus output as the target output pixel value.

Example 14 includes the method of any one of examples 11 to 13, including or excluding optional features. In this example, in response to the target output pixel being classified as a fading-edge pixel using bilinear minus output as the target output pixel value.

Example 15 includes the method of any one of examples 11 to 14, including or excluding optional features. In this example, in response to the target output pixel being classified as neither a leading-edge pixel nor a fading-edge pixel, a next pixel being a fading edge pixel, and a fractional component of the source map point being greater than 0.5, using bilinear plus plus output as the target output pixel value.

Example 16 includes the method of any one of examples 11 to 15, including or excluding optional features. In this example, in response to the target output pixel being classified as neither a leading-edge pixel nor a fading-edge pixel and a next pixel being a leading-edge pixel, using bilinear plus output as the target output pixel value.

Example 17 includes the method of any one of examples 11 to 16, including or excluding optional features. In this example, in response to the target output pixel being classified as neither a leading-edge pixel nor a fading-edge pixel, a previous pixel being a fading edge pixel, and a fractional component of the source map point being less than 0.5, using bilinear minus output as the target output pixel value.

Example 18 includes the method of any one of examples 11 to 17, including or excluding optional features. In this example, isolated detections/false positives are removed from the potential edges.

Example 19 includes the method of any one of examples 11 to 18, including or excluding optional features. In this example, the potential edge pixels are identified via content analysis.

Example 20 includes the method of any one of examples 11 to 19, including or excluding optional features. In this example, the target output value overrides generic resampling output value.

Example 21 is at least one computer readable medium for content based anti-aliasing having instructions stored therein that. The computer-readable medium includes instructions that direct the processor to identifying potential edge pixels in an input image; detecting thin edges in the potential edge pixels of the input image; detecting one-directional edges in the potential edge pixels of the input image; detecting strongly correlated edges in the potential edge pixels of the input image; deriving a target output value based on an edge type and classification of a corresponding input pixel as identified by a source map point.

Example 22 includes the computer-readable medium of example 21, including or excluding optional features. In this example, in response to the target output pixel being classified as a leading-edge pixel, a next pixel being a fading edge pixel, and a fractional component of the source map point being less than 0.5, using bilinear minus output as the target output pixel value.

Example 23 includes the computer-readable medium of any one of examples 21 to 22, including or excluding optional features. In this example, in response to the target output pixel being classified as a leading-edge pixel, a next pixel being a fading edge pixel, and a fractional component of the source map point being greater than 0.5, using bilinear plus plus output as the target output pixel value.

Example 24 includes the computer-readable medium of any one of examples 21 to 23, including or excluding optional features. In this example, in response to the target output pixel being classified as a fading-edge pixel using bilinear minus output as the target output pixel value.

Example 25 includes the computer-readable medium of any one of examples 21 to 24, including or excluding optional features. In this example, in response to the target output pixel being classified as neither a leading-edge pixel nor a fading-edge pixel, a next pixel being a fading edge pixel, and a fractional component of the source map point being greater than 0.5, using bilinear plus plus output as the target output pixel value.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to perform edge aware upscaling, the apparatus comprising:
   memory;
   instructions; and
   processor circuitry to execute the instructions to:
      determine whether potential edge pixels of an input image include a thin edge;
      determine whether the potential edge pixels of the input image include a one-directional edge; and
      derive a target output pixel value, the target output pixel value based on an edge type and a classification of a corresponding input pixel of the potential edge pixels, the edge type is at least one of the thin edge or the one-directional edge, the classification is a leading-edge pixel classification or a fading-edge pixel classification.

2. The apparatus of claim 1, wherein after a target output pixel is classified as the leading-edge pixel classification, a next pixel is a fading-edge pixel, and a fractional component of a source map point is less than 0.5, the processor circuitry is to use a bilinear minus output as the target output pixel value.

3. The apparatus of claim 1, wherein after a target output pixel is classified as the leading-edge pixel classification, a next pixel is a fading-edge pixel, and a fractional component of a source map point is greater than 0.5, the processor circuitry is to use a bilinear plus plus output as the target output pixel value.

4. The apparatus of claim 1, wherein after a target output pixel is classified as the fading-edge pixel classification, the processor circuitry is to use a bilinear minus output as the target output pixel value.

5. The apparatus of claim 1, wherein after a target output pixel is classified as neither the leading-edge pixel classification nor the fading-edge pixel classification, a next pixel is a fading-edge pixel, and a fractional component of a source map point is greater than 0.5, the processor circuitry is to use a bilinear plus plus output as the target output pixel value.

6. The apparatus of claim 1, wherein after a target output pixel is classified as neither the leading-edge pixel classification nor the fading-edge pixel classification and a next pixel is a leading-edge pixel, the processor circuitry is to use a bilinear plus output as the target output pixel value.

7. The apparatus of claim 1, wherein after a target output pixel is classified as neither the leading-edge pixel classification nor the fading-edge pixel classification, a previous pixel is a fading-edge pixel, and a fractional component of a source map point is less than 0.5, the processor circuitry is to use a bilinear minus output as the target output pixel value.

8. The apparatus of claim 1, wherein at least one of an isolated detection or a false positive is removed from a potential edge associated with the potential edge pixels.

9. The apparatus of claim 1, further including a potential edge detector to identify the potential edge pixels via content analysis.

10. The apparatus of claim 1, wherein the target output pixel value overrides a generic resampling output value.

11. A method to perform edge aware upscaling, the method comprising:
determining whether one or more edge types in potential edge pixels of an input image include a thin edge;
determining whether the one or more edge types in the potential edge pixels of the input image include a one-directional edge;
determining whether the one or more edge types in the potential edge pixels of the input image include a strongly correlated edge; and
deriving a target output pixel value based on the one or more edge types and a classification of a corresponding input pixel of the potential edge pixels, the classification is a leading-edge pixel classification or a fading-edge pixel classification.

12. The method of claim 11, wherein the deriving of the target output pixel value includes, after a target output pixel is classified as the leading-edge pixel classification, a next pixel is a fading-edge pixel, and a fractional component of a source map point is less than 0.5, using a bilinear minus output as the target output pixel value.

13. The method of claim 11, wherein the deriving of the target output pixel value includes, after a target output pixel is classified as the leading-edge pixel classification, a next pixel is a fading-edge pixel, and a fractional component of a source map point is greater than 0.5, using a bilinear plus plus output as the target output pixel value.

14. The medhod of claim 11, wherein the deriving of the target output pixel value includes, after a target output pixel is classified as the fading-edge pixel classification, using a bilinear minus output as the target output pixel value.

15. The method of claim 11, wherein the deriving of the target output pixel value includes, after a target output pixel is classified as neither the leading-edge pixel classification nor the fading-edge pixel classification, a next pixel is a fading-edge pixel, and a fractional component of a source map point is greater than 0.5, using a bilinear plus plus output as the target output pixed value.

16. The method of claim 11, wherein the deriving of the target output pixel value includes, after a target output pixel is classified as neither the leading-edge pixel classification nor the fading-edge pixel classificaton and a next pixel is a leading-edge pixel, using a bilinear plus output as the target output pixel value.

17. The method of claim 11, weherein the deriving of the target ouptut pixel value includes, after a target output pixel is classified as neither the leading-edge pixel classification nor the fading-edge pixel classification, a previous pixel is a fading-edge pixel, and a franctional component of a source map point is less than 0.5, using a bilinear minus output as the target output pixel value.

18. The method of claim 11, further including removing at least one of an isolated or a false positive from a potential edge associated with the potential edge pixels.

19. The method of claim 11, further including identifying the potential edge pixels via content analysis.

20. The method of claim 11, wherein the target output pixel value overrides a generic resampling output value.

21. At least one computer readable storage device comprising instructions to cause a computing device to at least:
detect at least one edge type in potential edge pixels of an input image, the at least one edge type is at least one of a thin edge, a one-directional edge, or a strongly correlated edge; and
derive a target output pixel value based on the at least one edge type and a classification of a corresponding input pixel of the potential edge pixels, the classification is a leading-edge pixel classification or a fading-edge pixel classification.

22. The at least one comnputer readable storage device of claim 21, wherein after a target output pixel is classified as the leading-edge pixel classification, a next pixel is a fading-edge pixel, and a frantional component of a source map point is less than 0.5, the instructions are to cause the computing device to derive the target output pixel value using a bilinear minus output as the target output pixel value.

23. The at least one computer readable storage device of claim 21, wherein after a target output pixel is classified as the leading-edge pixel classification, a next pixel is a fading-edge pixel, and a fractional component of a source map point is greater than 0.5, the instruction are to cause the computing device to derive the target output pixel value using a bilinear plus plus output as the target output pixel value.

24. The at least one computer readable storage device of claim 21, wherein after a target output pixel is classified as the fading-edge pixel classification, the instructions are to cause the computing device to derive the target output pixel value using a bilinear minus output as the target output pixel value.

25. The at least one computer readable storage device of claim 21, wherein after a target output pixel is classified as neither the leading-edge pixel classification nor the fading-edge pixel classification, a next pixel is a fading-edge pixel, and a franctional component of a source map point is greater than 0.5, the ionstructions are to cause the computing device to derive the target output pixel value using a bilinear plus plus output as the target output pixel value.

* * * * *